(12) United States Patent
LeCraw

(10) Patent No.: US 7,258,798 B2
(45) Date of Patent: *Aug. 21, 2007

(54) POTABLE WATER TREATMENT PLANT AND METHOD OF MAINTAINING SAME

(75) Inventor: Robert LeCraw, Newmarket (CA)

(73) Assignee: MS Filter Inc., Newmarket, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/217,695

(22) Filed: Sep. 1, 2005

(65) Prior Publication Data

US 2006/0021953 A1 Feb. 2, 2006

Related U.S. Application Data

(62) Division of application No. 10/167,874, filed on Jun. 12, 2002, now Pat. No. 6,953,525.

(51) Int. Cl.
C02F 1/28 (2006.01)
C02F 1/78 (2006.01)

(52) U.S. Cl. ............ 210/694; 210/760; 210/795; 210/807; 210/202; 210/205; 210/275; 210/284; 210/290

(58) Field of Classification Search ............ 210/668, 210/694, 760, 793, 795, 796, 807, 202, 203, 210/205, 259, 269, 271, 275, 280, 284, 290, 210/150, 151, 617

See application file for complete search history.

(56) References Cited

U.S. PATENT DOCUMENTS

| 4,547,286 | A | 10/1985 | Hsiung | 210/738 |
| 4,643,831 | A | 2/1987 | Fletcher | 210/668 |
| 4,798,669 | A | 1/1989 | Bachhofer et al. | 210/109 |
| 4,911,831 | A | 3/1990 | Davison et al. | 210/86 |

(Continued)

FOREIGN PATENT DOCUMENTS

CA 338313 1/1934

(Continued)

OTHER PUBLICATIONS

Masschelein, "Ozone et Ozonation Des Eaux", 2$^{nd}$ Edition, © Technique et Documentation—Lavoisier, 1991, 11 rue Lavoisier—F75384 Paris Cedex 08.

(Continued)

*Primary Examiner*—Matthew O. Savage
(74) *Attorney, Agent, or Firm*—Fay Sharpe LLP

(57) ABSTRACT

A package plant for treating raw water to yield potable water. The package plant includes an inlet for raw water, followed by an ozonator for disinfecting the water. Next is provided an up flow roughing filter including a chemically active layer, on top. A slow sand filter follows, which is sized and shaped to promote growth of a biomass for water purification. The up flow roughing filter removes particulates, contributes to the removal of dissolved organics, and protects the slow sand biomass by removing disinfection residuals. In another aspect a method of maintaining the plant is provided, including washing the up flow roughing filter by draining water down through it, providing a vigorous up flow to agitate the top layer, and then washing the slow sand filter.

11 Claims, 2 Drawing Sheets

U.S. PATENT DOCUMENTS

| | | | | |
|---|---|---|---|---|
| 5,080,808 | A | 1/1992 | Kim et al. | 210/792 |
| 5,302,288 | A | 4/1994 | Meidl et al. | 210/616 |
| 5,505,856 | A | 4/1996 | Campen et al. | 210/668 |
| 5,514,284 | A | 5/1996 | Urban et al. | 210/709 |
| 5,547,584 | A | 8/1996 | Capehart | 210/669 |
| 5,728,305 | A | 3/1998 | Hawkinson | 210/760 |
| 5,744,037 | A | 4/1998 | Fujimura et al. | 210/620 |
| 5,973,996 | A | 10/1999 | Zhevelev et al. | 367/99 |
| 5,997,750 | A | 12/1999 | Rozelle et al. | 210/744 |
| 6,027,642 | A | 2/2000 | Prince et al. | 210/180 |
| 6,090,294 | A | 7/2000 | Teran et al. | 210/739 |
| 6,153,111 | A | 11/2000 | Conrad et al. | 210/741 |
| 6,299,779 | B1 | 10/2001 | Pattee | 210/694 |
| 6,953,525 | B2 * | 10/2005 | LeCraw | 210/202 |

FOREIGN PATENT DOCUMENTS

| | | |
|---|---|---|
| CA | 1162664 | 2/1984 |
| CA | 1191794 | 8/1985 |
| CA | 1263769 | 12/1989 |
| CA | 2027487 | 10/1990 |
| CA | 2330528 | 8/1991 |
| CA | 1293067 | 12/1991 |
| CA | 1303325 | 6/1992 |
| CA | 1306421 | 8/1992 |
| CA | 2079578 | 9/1992 |
| CA | 2130181 | 3/1993 |
| CA | 2095788 | 5/1993 |
| CA | 2105650 | 9/1993 |
| CA | 1330460 | 6/1994 |
| CA | 2129170 | 7/1994 |
| CA | 1335519 | 5/1995 |
| CA | 2189757 | 5/1995 |
| CA | 2163799 | 11/1995 |
| CA | 2052182 | 5/1996 |
| CA | 2199517 | 7/1996 |
| CA | 2203707 | 4/1997 |
| CA | 2214954 | 9/1997 |
| CA | 2264915 | 9/1997 |
| CA | 2106495 | 6/1998 |
| CA | 2009752 | 9/1998 |
| CA | 2289060 | 11/1999 |
| CA | 2301450 | 3/2000 |
| CA | 2200464 | 8/2001 |
| CA | 2057874 | 4/2002 |
| CA | 2090339 | 7/2002 |

OTHER PUBLICATIONS

Robson, et al. "Ozonation Facility Design Consideration & Experiences", AWWA Seminar on Practical Experiences with Ozone for Organics Control & Disinfection—Annual Conference, Cincinnati, OH Jun. 17-21, 1990.

* cited by examiner

POTABLE WATER TREATMENT PLANT AND METHOD OF MAINTAINING SAME

This application is a Divisional of U.S. application Ser. No. 10/167,874, filed Jun. 12, 2002, now U.S. Pat. No. 6,953,525.

FIELD OF THE INVENTION

This invention relates generally to the field of water treatment, and particularly to methods and apparatuses for treatment of raw water to yield potable water, or, water fit for human or animal consumption. Most particularly this invention relates to package plants and processes for raw water purification.

BACKGROUND OF THE INVENTION

In the past, many water treatment methods and apparatuses have been designed and developed. Some are used for the treatment of waste water, to prevent damage to the environment and others are for the purification of raw water, for the safety and health of humans or animals consuming the water. Raw water in this sense means waters from any source, whether raw water, or ground water under the influence of raw water or other water source that requires disinfection and purification before being safe for human consumption. Health and safety concerns relating to potable or drinking water are of an increasing importance in light of deadly pathogens, such as certain strains of *E. Coli*. Such pathogens are becoming more prevalent due to intensive agricultural techniques and thus more likely to be found contaminating communal raw water sources.

Many of the prior art water treatments involve large and expensive plants, which require the use of metered amounts of chemicals, such as flocculants to remove turbidity and chlorine for disinfection, among others. While suitable for large scale urban facilities, such plants are not economic for smaller population groups, such as remote towns or small groups of people. Further such complex prior art plants require sophisticated monitoring systems and skilled employees to manage the operation of the plant, which expertise can be difficult to find in rural or smaller communities.

What is needed is a simple scalable process and apparatus for the treatment of raw water to render the same fit for human consumption. An attempt was made to design such a plant as shown in my own prior Canadian patent application 2,163,799 filed Nov. 27, 1995. However, the plant I describe therein, while providing reasonable results had some limitations and drawbacks. More particularly, the plant called for the use of a third treatment stage consisting of a deep bed of granulated activated carbon, as a final purification step. This last stage of the process treated the water by adsorption, absorption and biological activity. Unfortunately, such a system results in the activated carbon losing its effectiveness over time, which requires that the activated carbon be replaced periodically. By using larger amounts of activated carbon the effective life of the third stage can be increased, but this simply means it is a bigger job to replace it when required. Since the third stage is a deep bed by design, this is a big, messy, and unpleasant job. As such it is likely to be neglected by unsophisticated or undisciplined operators, resulting in a decline in water quality and safety. Quite simply, the activated carbon will lose its effectiveness over time posing a health risk.

Thus, what is needed is an operator friendly and low maintenance package plant system, which still incorporates the desired treatment requirements without the need for chemicals. Most preferably to maintain such a system operators will not need to shovel out a deep mucky tank of carbon particles as in the prior art.

SUMMARY OF THE INVENTION

The present invention comprehends a simple and easy to operate and maintain water purification systems for removing water-born pathogens from raw water, and for reducing the concentration of other raw water constituents of concern such as colour, taste and odour, compounds, organic chemicals, turbidity and metals. The present invention is directed to methods and apparatuses that provide potable water for consumption. In particular the present invention is directed to a self contained scalable package plant that is easy to use and maintain and also is reliable in removing pathogens and contaminants.

Most preferably the present invention provides easy and simple maintenance features to permit the package plant to be easily maintained. Further the present invention avoids the need for constant supervision of the adding of chemicals and avoids the need for periodic messy and labour intensive maintenance. As such, the present invention is more likely to be maintained by small and rural operators than the prior art devices.

The present invention comprehends treating raw water which is directed into the package plant through an inlet. Then the water is disinfected, most preferably by means of ozone at dosages in the appropriate range of 1.0 to 5.0 mg/L, after which an up flow roughing filter is used to remove larger particulates. Then a slow sand filter, upon which an organic biomass is grown, is used to finally filter and purify the water at filtration rates in the range of 0.1 to 0.4 m/hr. The present invention comprehends using a chemically active medium as one of the filter layers in the roughing filter to, among other things, remove disinfection byproducts from the water being treated, prior to the same reaching the biomass. The empty bed contact time (EBCT) is in the range of 20 to 40 minutes.

According to a further aspect of the present invention the chemically active filter is most preferably activated carbon and forms the upper layer of the roughing filter. To service the plant, simplified draining and washing steps are facilitated by the physical structures of the package plant elements. The activated carbon can be cleaned by means of a thorough washing, without needing to be replaced, thus avoiding a messy and awkward maintenance step of the prior art.

Further the present invention includes hydraulic configurations to facilitate the washing steps as well as other structures to separate and remove the detritus removed during washing.

Thus, according to a first aspect of the present invention there is provided a package plant for treating raw water to produce potable water, said package plant comprising:

an inlet for receiving water to be treated;

an ozonator for disinfecting said water;

an up-flow roughing filter including at least one coarse filter media for removing coarse solids from said water, and at least one less coarse chemically active filter media for removing less coarse solids from said water and any residual disinfectants from said ozonator; and a down-flow slow sand filter, said slow sand filter being sized and shaped to promote a biomass growth for purifying said water, wherein said chemically active filter media protects said biomass from residual disinfectants and contributes to the removal of the byproducts of disinfection.

Further, according to a second aspect there is provided a method of maintaining a package plant for producing potable water from raw water sources, wherein said package plant includes an upflow roughing filter and a slow sand filter located in a common tank, said method comprising the steps of:

draining said common tank through said roughing filter to remove, by back flow, particles trapped in said roughing filter;

flowing water at a rate of between 30 and 40 m/hr up through said roughing filter to agitate an upper layer of said roughing filter to remove unwanted material from said upper layer to clean the same; and causing said unwanted material to flow into an associated wash trough, thereby removing said unwanted material from said common tank without fouling said slow sand filter.

BRIEF DESCRIPTION OF THE DRAWINGS

Reference will now be made to preferred embodiments of the present invention, by way of example only, and in which.

DETAILED DESCRIPTION OF THE PREFERRED EMBODIMENTS

Figure 1:
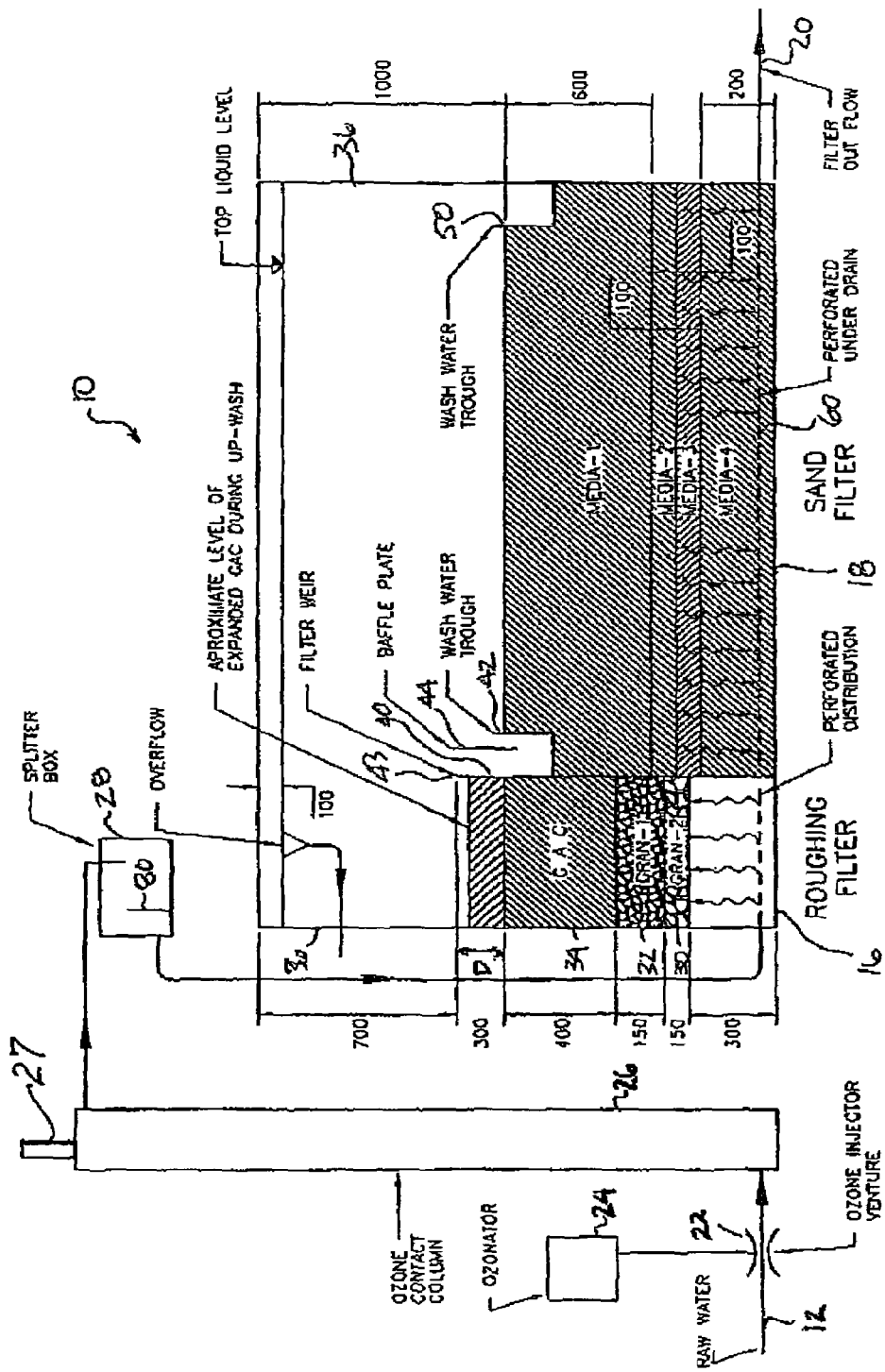
FIG. 1 is a side view of a package plant according to the present invention.

FIG. 1 shows a package plant, indicated generally at 10 according to the present invention. The package plant includes a water inlet 12, a disinfection section 14, an upflow roughing filter 16 and a slow sand filter 18 leading to an outflow 20. Each of these elements is described in more detail below.

The water inlet 12 can be connected to any raw water source, such as surface water from a stream, lake or other surface water source or from a ground water supply that requires filtration. Raw water sources can vary widely in the degree of treatment required to yield potable water. Qualities such as turbidity, discolouration, and the specific type and degree of contamination can vary widely. The present invention is directed to the overall structure and maintenance techniques for a package water plant. The particular process conditions however, will have to be tailored for each particular water source, and may even need to be varied to accommodate seasonal changes in raw water quality. It will be appreciated by those skilled in the art that the present invention comprehends a range of process conditions which may be used to purify a range of raw water quality. Typically such process conditions will be established by due examination and testing of the raw water qualities.

The raw water is pumped in and then passes through a venturi 22. As the water speeds through the venturi 22 a low pressure is created, drawing in ozone from an ozonator 24. To improve disinfection, the ozone is permitted to diffuse and mix with the raw water in a vertical contact column 26. From there the water is fed into a splitter box 28. A pump, not shown, is provided to power the raw water past the venturi 22 and up the contact column 26.

Although reference has been made to a venturi injector 22, an ozone generator 24, and an ozone contact column 26, it will be understood that the present invention comprehends all forms of pre-ozonation which can be used to treat raw water. A venturi based system is preferred due to its simplicity of operation however a compressor and oxygen feed type system might also be used.

The venturi 22 has the beneficial effect of automatically regulating the amount of ozone used. The faster the flow of raw water, the greater the low pressure and the more ozone will be drawn in. Conversely for slower flows, less ozone is needed and also less is drawn in through the venturi 22.

The contact column 26 is a known device which may be purchased from a third party supplier such as Fabricated Plastics. The purpose of the contact column is to permit the ozone to be fully mixed with the flow of water to promote good disinfection results. The contact column 26 may include baffles (not shown) and the like to promote turbulent flow and good mixing of the ozone with the water. Typically provision will be made in the contact column 26 to vent excess ozone before the water is released from the contact column. A vent 27 is shown in FIG. 1. The ozone removed can be safely vented, or re-converted to oxygen.

Once the free ozone has been removed the next step is to allow the water to flow into a splitter box 28. The purpose of the splitter box 28 is simply to let the water be divided into two or more streams through parallel sets of package plants. Thus, the ozonator 24 is set to provide enough disinfection having regard to the raw water quality and the flow rate of the raw water. To a certain extent, the venturi 22 design can accommodate a variable flow rate automatically, as noted above.

It can now be understood that the balance of the package plant will be sized to accommodate certain predetermined flow rates (to achieve desired residence times) to operate efficiently. In the event that the demand for potable water exceeds the plant capacity, then plant capacity may be simply increased by adding extra parallel treatment modules and splitting the flow through the splitter box 28, through two or more parallel treatment facilities. In this way the through put volume can be increased without changing treatment quality. Thus, it can now be appreciated that the present invention comprehends a scalable package plant which can have its through put capacity increased simply by adding parallel treatment modules.

The next step is to pass the raw but ozonated water through an up flow roughing filter 16. Good results have been achieved with an up flow filter having three layers, namely, a first layer 30 which is comprised of larger granular material, a second layer 32 having slightly smaller granular material and a third layer 34 having the finest granular material. It will be noted that the roughing filter 16 and the slow sand filter 18 are both contained within a common tank 36, as will be explained in more detail below. The common tank may for example extend 70 cm above the top of the roughing filter 16.

Reasonable results have been achieved with the thickness of the lower layer being 15 cm, and the middle layer also being 15 cm. A space above the outlet 29 can also be provided, which is preferably about 30 cm in height. The upper layer of the roughing filter can be about 40 cm thick.

The roughing filter removes particulates from the water without coagulant chemicals. It is preferred to use a course granular material of 8 to 12 mm size in the bottom stage, to separate the granular material from the under drains, followed by a middle layer of between 2.5 and 3.5 mm sized granules, followed by a third or upper layer with even finer granules of about 0.8 to 1.2 mms.

The bottom and middle layers of the roughing filter are for the physical separation and trapping of water born particulates. Thus, the bottom and middle layers can be made from any suitable material, such as aggregate, providing the pore spaces are of an adequate size. Further, while the present invention is shown having two layers of aggregate, more layers could be used if desired. In such a case the gradation of the pore sizes between the layers would permit a removal of even finer particulates prior to the raw water reaching the upper layer.

The upper layer is most preferably formed from an activated carbon layer. Activated carbon is desirable for several reasons. Firstly, it will remove suspended solids through physical straining, it will fluidize more readily during washing due to its lower specific gravity, it will support biological growth due to its porous structure, and thereby contribute to the removal of byproducts of ozonation, and it will chemically react with ozone or chlorine residuals removing them so that the downstream biological processes are not impaired. As can now be understood, the activated carbon filter layer is positioned upstream of the slow sand filter. The slow sand filter is effective in large measure due to the growth of a biomass on the filter grains. Disinfection components can damage or even destroy such a biomass, leading to a loss of purification function. The present invention therefore provides in a single package plant both a disinfection step and a biomass purification step in which the biomass is protected from the upstream disinfection effects.

As can be seen the roughing filter is contained in a inner vessel 40 contained within the common tank 36. Adjacent to the top of the inner vessel 40 is a wash trough 42, surmounted by a baffle plate 44. A filter weir is formed at 43. At the opposite side of the common tank 36 is provided a second wash trough 50. The wash troughs 42, 50 are used in the simplified maintenance procedures of the present invention which are explained in more detail below.

After passing through the activated carbon filter layer the water enters common tank 36. The common tank may provide for a top liquid level of up to 60 cm above the level of the roughing filter. Once in the common tank 36 the speed of the water is slowed considerably, due to the increase in the cross sectional area of flow from the up flow roughing filter as compared to the down flow sand filter. This permits the water to interact with the biomass of the slow sand filter in a known manner to permit the purification of the water. Drains 60 are provided below the slow sand filter where the treated potable water is removed.

Good results have been obtained through using a four media slow sand filter. Media 1 is preferably 0.25 to 0.5 mm and extends down about 60 cm. Media 2 and 3 may be made from 0.8 to 1.2 and 2.5 to 3.5 mm respectively sized gravel and may together extend for 10 cm each for a total of about 20 cm. Lastly, Media 4 may be made from 8.0 to 12 mm gravel and extend 20 cm. The drain 60 may be for example in the form of a perforated under drain.

Although four types of media are shown and provide good results, more or fewer could also be used. Also, while particular sizes of media are taught herein, these too can be varied, without departing from the scope of this invention. The slow sand filter works through a combination of physical straining and biological treatment to remove turbidity, bacteria, viruses, *Giardia cysts*, and *Cryptosporidium oocysts*.

It will be noted that from the top of the ozone contact column to the potable water output is a gravity feed flow path. Thus, the present invention is fairly efficient in terms of its energy demands.

Having described the position and function of the elements, the improved maintenance procedures of the present invention can now be comprehended. As shown in the FIG. 1, the inner vessel 40 includes an upwardly extending lip at 41 to form weir 43. The lip extends a distance D above the level of the activated carbon layer. D is a predetermined distance as explained below. Good results have been obtained where D is 30 cm.

After a certain operation time, the plant of the present invention will need to be taken off line, for maintenance. The exact amount of time permitted between maintenance events will vary, depending upon the properties of the raw water being treated and process conditions. However, over time the pore spaces in the roughing filter will become clogged up and the activated carbon filter may become fouled and lose its effectiveness. Also the slow sand filter biomass may become too overgrown and need to be reduced. This will be indicated by an increase in the head of water in the common tank above the slow sand filter. The present invention thus comprehends periodic maintenance of the plant performed by simply washing the components of the package plant.

During such periodic plant maintenance, the following procedure is followed. Firstly, the water being pumped into the plant is stopped, so that the flow through the plant stops. Then the water in the common tank needs to be drained. In a first drainage step, the water is drained down through the roughing filter. It is preferred to do this rapidly, over a 5 to 10 minute period, to facilitate flushing the roughing filter. As will now be understood this drainage step will cause the flow through the filter to be in a reverse direction to its normal flow direction. This will have the effect of removing most of the particles which may be stuck in the pore spaces of the lower and middle filter layers and held in place by the flow of water. What has been discovered is that such a reverse flush is not sufficient to clean the activated carbon layer. This is due to two factors. Firstly the flow volume is not enough to dislodge the particles from the smaller pore spaces and secondly, there are likely various forms of growth occurring in the filter which are securely attached to the filter particles. Thus, a different technique is required.

The present invention provides for pumps to be connected to the lower drain of the roughing filter. Thus, a strong flow of water with a velocity of approximately 35 m/hr can be forced upwardly through the roughing filter for a period of 5 to 10 minutes. One of the advantages of activated carbon is that it has a low specific gravity in the range of 1.2 to 1.6 (saturated). This facilitates agitative washing during the strong washing flow. Thus, the present invention comprehends making the height of D equal to the height the activated carbon layer will reach during the agitative washing step. In this way the individual grains are tumbled and the trapped particles are released. As well, such aggressive washing has been found useful to dislodge growths from the filter grains.

During the washing step the washed out detritus or other material will tend to be pushed to the top of the inner vessel. Then, it is expelled over the weir 43 into the washing trough 42. Thus, it can now be appreciated that the baffle 44 prevents such unwanted material from falling into the common tank 36 onto the slow sand filter 18 and instead directs it into the wash trough 42. The wash trough 42 in turn is drained outside of the plant where the removed material can be safely disposed of. As a result of the agitative washing step the activated carbon filter is cleaned, and no worker or operator was required to enter the tank to remove or replace the same. If some filter material is lost, it may be necessary to top up the same, but if the weir 43 is appropriately positioned this is not too likely to be necessary.

The next step is simply to wash down the slow sand filter. Once the water head in the common tank is drained to the level of the roughing filter, the top level or surface of the slow sand filter can be washed. Thus, it is preferred to position the wash trough weir at about the same level as the top of the slow sand filter. It has been found that adequate results have been obtained by using a hose to spray the upper surface of the sand, which causes the biomass over growth to separate from and be washed along the surface towards the other wash trough 50. In this manner the sand filter can also be refreshed to permit higher flow rates to be achieved. If desired, manual scrapers can be used to facilitate the process.

Figure 2:
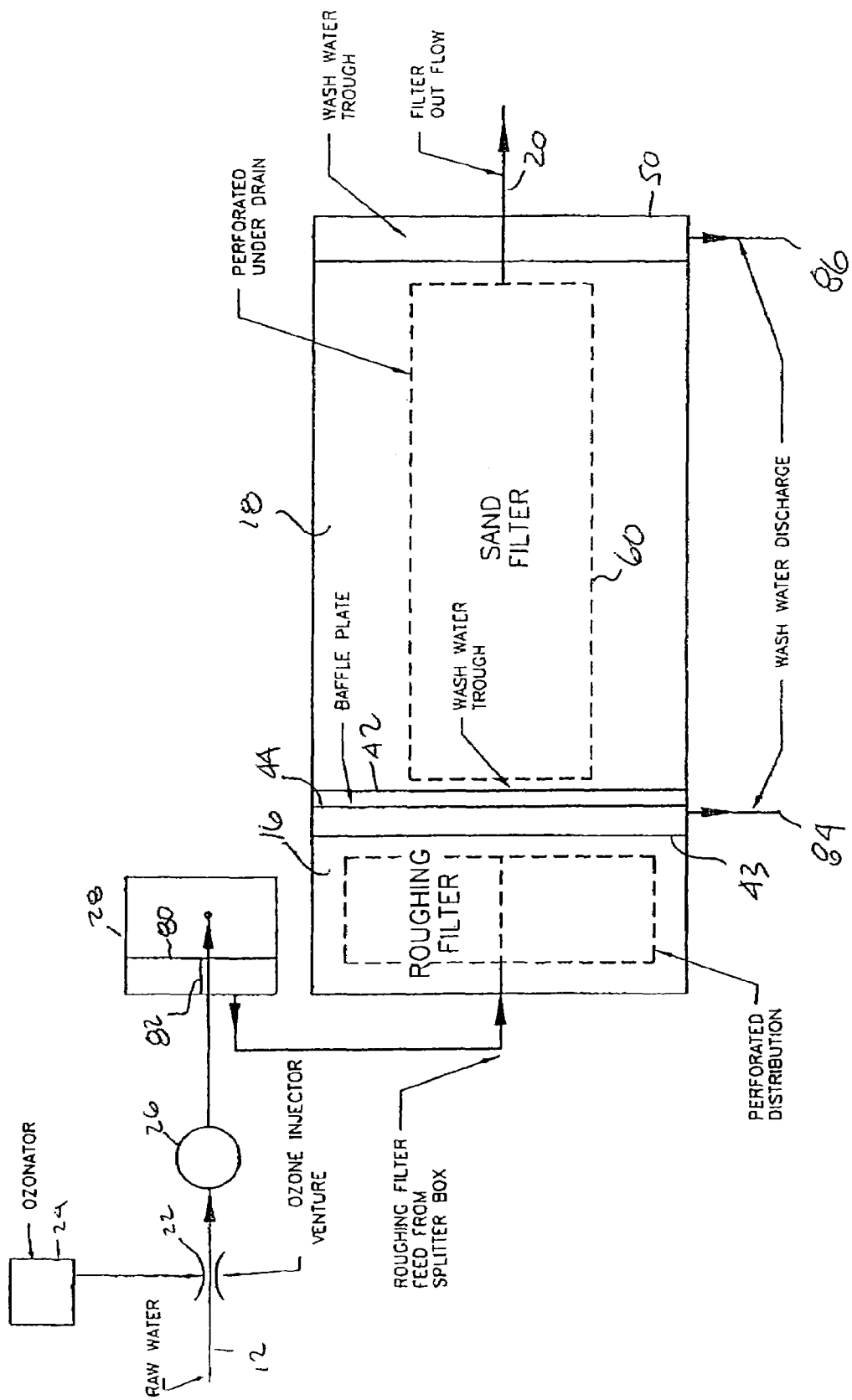
FIG. 2 is a top view of the package plant of FIG. 1.

FIG. 2 shows the same elements as FIG. 1, from a top perspective. Thus, in FIG. 2 the raw water inlet 12, the ozonator 24 and the contact column 26 are shown. The splitter box 28 is shown, with a weir 80, and a baffle 82. As can now be appreciated, simply by placing one or more baffles 82 at appropriate positions, the flow of water can be diverted into two or more parallel paths. Thus, the splitter box is only required where multiple parallel paths are used.

Following the splitter box, the water is directed up through the roughing filter 16 and down through the slow sand filter 18. Wash water waste discharges 84 and 86 are also shown.

It will be appreciated by those skilled in the art that while reference has been made to a preferred embodiment of the present invention above, various modifications and alterations can be made without departing from the broad spirit of the appended claims. For example, the specific media sizes and depths can be varied somewhat, without altering performance too much, and will be described in some cases depending upon the nature of the raw water source. As well, various disinfection methods could be used, provided that the slow sand biomass is protected from disinfection residuals chemically active media.

I claim:

1. In a method of treating raw water with a package plant to produce potable water, said package plant including an inlet for receiving water to be treated, an ozonator for disinfecting said water, a contact column to permit ozone from said ozonator to mix with said water, said contact column having a vent to remove free ozone from said water before said water is directed to an upflow roughing filter, said upflow roughing filter including at least one lower coarse filter media and at least one upper less coarse chemically activated carbon filter media in the roughing filter, a downflow slow sand filter, wherein said upflow roughing filter and downflow sand filter are located in a common tank, said method including:
   stopping the flow of water to the inlet;
   draining water from said common tank through said roughing filter;
   flowing wash water up through said roughing filter to agitate and expand said upper activated carbon filter media of said roughing filter;
   flowing the wash water through an associated wash trough in said common tank and causing said unwanted material to flow into said associated wash trough, thereby removing said unwanted material from said common tank without fouling said slow sand filter; and
   washing the slow sand filter.

2. The method of claim 1, wherein the step of draining said common tank drains enough of the water in the common tank to permit cleaning of said slow sand filter.

3. The method a claim 2, wherein said slow sand filter is washed by means of a hose, wherein unwanted material is washed over to and into a second wash trough adjacent to said slow sand filter.

4. The method of claim 2, further including: cleaning said slow sand filter by removing said unwanted material from said slow sand filter by mechanically removing the same.

5. The method of claim 2, further including: cleaning the slow sand filter by manually removing said unwanted material from said slow sand filter.

6. The method of claim 1, wherein said step of flowing water through said roughing filter is done for a period of time of between 5 and 10 minutes.

7. The method of claim 6, further including the step of disposing of said unwanted material.

8. The method of claim 1, further including the step of draining unwanted material from said wash trough outside of said package plant.

9. A package plant for producing potable water from raw water sources, said package plant including:
   an inlet for receiving water to be treated;
   an ozonator for disinfecting said water;
   a contact column to permit ozone from said ozonator to mix with said water, said column having a vent to remove free ozone from said water before said water is directed to an upflow roughing filter;
   said upflow roughing filter and a down-flow slow sand filter are located in a common tank, the roughing filter including at least one lower coarse filter media for removing coarse solids from said water, and at least one upper less coarse chemically activated carbon filter media for removing less coarse solids from said water, said water media;
   a means for draining said common tank trough said roughing filter to remove, by back flow, particles trapped in said roughing filter;
   a means for flowing water at up to trough said roughing filter to agitate the activated carbon upper layer of said roughing filter to remove unwanted material from said upper filter media to clean the same such that said upper filter media is expanded in ah upward direction during said agitative step; and
   a wash trough located in said common tank such that said unwanted material flows into the wash trough, thereby removing said unwanted material from said common tank without fouling said slow sand filter.

10. A package plant for producing potable water from raw water sources as claimed in claim 9, further including:
   a hose for washing said slow sand filter; and
   a second wash trough located adjacent to said slow sand filter such that unwanted material washed loose by the hose is washed into the second wash trough.

11. A package plant for producing potable water from raw water sources as claimed in claim 9, further including:
   a mechanical means for removing said unwanted material from said slow sand filter.

* * * * *